(12) United States Patent
Mungur et al.

(10) Patent No.: US 9,275,125 B1
(45) Date of Patent: Mar. 1, 2016

(54) SYSTEM FOR ORGANIZING DATA FROM A PLURALITY OF USERS TO CREATE INDIVIDUAL USER PROFILES

(71) Applicant: Zipscene LLC, Cincinnati, OH (US)

(72) Inventors: Sameer Mungur, Cincinnati, OH (US); Rob Franks, Mt. Pleasant, SC (US); Mark Schneider, Loveland, OH (US); Tony Blankemeyer, Cincinnati, OH (US); Mohamed Berete, Cincinnati, OH (US); James Hight, Batavia, OH (US); Chris Breneman, Cincinnati, OH (US); Kevin Breneman, Cincinnati, OH (US); Doug Shawhan, Cincinnati, OH (US); Andrew Oppenlander, Cincinnati, OH (US); Jonathan Richman, Mason, OH (US)

(73) Assignee: Zipscene LLC, Cincinnati, OH (US)

( * ) Notice: Subject to any disclaimer, the term of this patent is extended or adjusted under 35 U.S.C. 154(b) by 0 days.

(21) Appl. No.: 14/797,749

(22) Filed: Jul. 13, 2015

Related U.S. Application Data

(60) Provisional application No. 62/024,212, filed on Jul. 14, 2014.

(51) Int. Cl.
*G06F 17/30* (2006.01)
*G06F 15/16* (2006.01)

(52) U.S. Cl.
CPC ...... *G06F 17/30575* (2013.01); *G06F 17/3051* (2013.01); *G06F 17/30371* (2013.01); *G06F 17/30401* (2013.01); *G06F 17/30528* (2013.01); *G06F 17/30867* (2013.01)

(58) Field of Classification Search
None
See application file for complete search history.

(56) References Cited

U.S. PATENT DOCUMENTS

| | | | | |
|---|---|---|---|---|
| 2006/0064428 A1* | 3/2006 | Colaco | ............. | G06F 17/30917 |
| 2008/0243885 A1* | 10/2008 | Harger | ............. | G06F 17/30289 |
| 2010/0161634 A1* | 6/2010 | Caceres | ............ | G06F 17/30306 707/758 |
| 2010/0274815 A1* | 10/2010 | Vanasco | ............ | G06F 17/30867 707/798 |
| 2015/0120783 A1* | 4/2015 | Talmor | ................... | H04L 67/10 707/798 |

* cited by examiner

*Primary Examiner* — Alex Gofman
(74) *Attorney, Agent, or Firm* — Frost Brown Todd LLC

(57) ABSTRACT

A system and related methods for organizing incoming data into profiles and persons based upon identifying characteristics. Profiles contain identifying characteristics that are assigned different values based upon reliability factors, such as age of the data, or generality of the data. These values are used to link a plurality of profiles together into a person. As persons are created and stored by the system, the introduction of new persons causes both new data and existing data to be evaluated so that when information for a person already present in the system is entered the objects are merged rather than duplicated. Self healing mechanisms allow data integrity to be maintained despite changes in configuration or data reliability valuation by re-evaluating links between profiles and identification of persons when a change is detected. Several APIs allow end users to insert new data an access existing data.

10 Claims, 14 Drawing Sheets

SYSTEM FOR ORGANIZING DATA FROM A PLURALITY OF USERS TO CREATE INDIVIDUAL USER PROFILES

CROSS REFERENCE TO RELATED APPLICATIONS

This is a continuation of, and claims the benefit of, U.S. provisional patent 62/024,212, filed on Jul. 14, 2014, the disclosure of which is hereby incorporated by reference in its entirety.

FIELD

The disclosed technology pertains to a system for accumulating, normalizing, and segmenting data.

BACKGROUND

Vendors are struggling to provide better cross-channel experiences for their customers. Ideally, these experiences take advantage of digitization to provide customers with targeted, just-in-time product or service information in a seamless way. However, this is often not possible based on current practices in the art. Due to the large volume of data being created and modified in cross channel data systems, conventional database schema are inefficient and offer poor performance for modifying and accessing data on demand. Another issue in conventional data stores is the difficulty in achieving atomic operations and efficiently locking objects during read and write operations to maintain data integrity. In order to improve these marketing efforts, companies need to take a different approach to managing the customer decision process.

BRIEF DESCRIPTION OF THE DRAWINGS

The drawings and detailed description that follow are intended to be merely illustrative and are not intended to limit the scope of the invention as contemplated by the inventors.

DETAILED DESCRIPTION

The inventors have created technology which can be used to implement a database, database access methods, and related server that allow advanced analytics to be applied to a large amount of structured and unstructured data representing customer experiences to gain a 360-degree view of customers by associating events to persons dynamically. One aspect of the inventor's technology builds engagement algorithms based on empirical analysis of customers' recent behaviors, social media and past interactions with a company. Using the disclosed technology, data from social media and past experiences can be linked to a person even though they may pre-exist a company's knowledge of the person now being engaged. As described herein, to get this full customer portrait rather than a series of unrelated snapshots, companies can access a data management server and central database that combines all the contacts a customer has with a brand in the past and present: basic consumer data plus information about transactions, browsing history, social media sentiment and interactions. The disclosed technology can be used to create segmentation strategies with attribution modeling to better visualize the customer portrait.

For example, by linking past and present snapshots of a customer's web browsing, social media comments, purchasing history and environmental factors (e.g. weather, sports events), the disclosed technology can be used to support engaging a customer at the critical decision making points and identify other previously unknown customers as they reach similar decision points. An embodiment of the disclosed technology which is often referred to here as a Smart Data Management Platform (sDMP) is, in simple terms, a complete management platform for a data warehouse. Such a sDMP may be made up of many pieces of software that accumulate, normalize, and segment data in a way that's useful for marketers, publishers and other businesses. An sDMP may be implemented to house and manage any form of information, including cookie IDs, and to generate audience segments, which are subsequently used to target specific users with digital media. Such an sDMP can tie all the activity, web behavior, information "crumbs" and resulting campaign and audience data together in one, centralized location and use it to optimize sales campaigns, offer allocation, attribution modeling, guest analytics, future media buys and ad creative.

Figure 6:
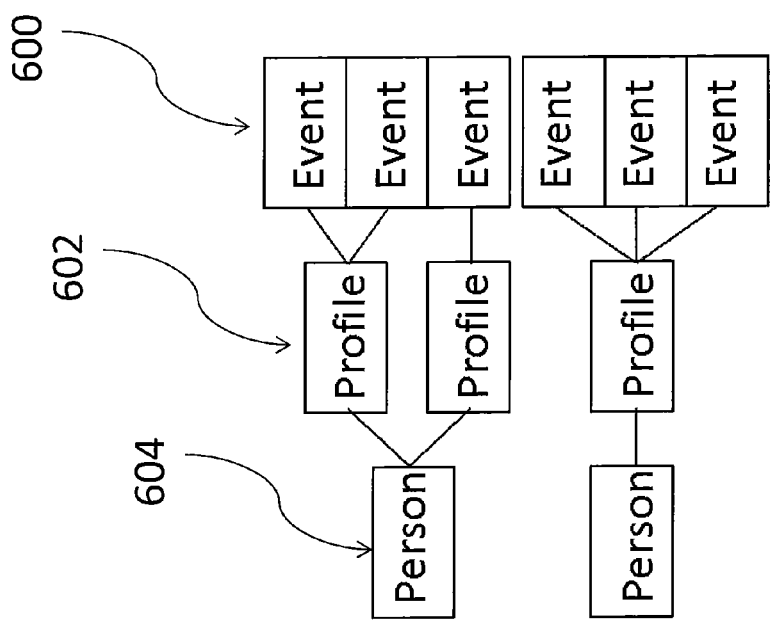
FIG. 6 shows a diagram of exemplary relationships between events, profiles, and persons.

A system implemented based on this disclosure may operate using three basic data constructs: Profiles, Events, and People. FIG. 6 shows exemplary relationships between these three data constructs. An event (600) represents an occurrence at a point in time; for example an order being placed, or a click on a web site. An event (600) may include any type of information generated by the underlying occurrence, such as a source, IP address, name, email, address, phone number, item ordered, or web element clicked. A time and date of occurrence may also be included with an event (600), or may be generated and associated with the event (600) based upon the time that it is entered into the system. Every event (600) is associated with a profile (602). For example, multiple clicks on a web site in a single browser session may all be associated with the same profile, with the first click causing the creation of the profile, and subsequent clicks being added to the newly created profile. Multiple clicks on a web site in different browser sessions may result in multiple profiles being created, with each profile being associated with only a single event. A profile (602) is one slice of event information about a person, from a single source. There may be multiple profiles (602) that represent the same actual person. A person (604) is a grouping of one or more profiles (602) that are determined to likely be from the same person. Stated another way, the data represented by a person is a set of profiles, and the data represented by a profile is a set of events.

Figure 1:
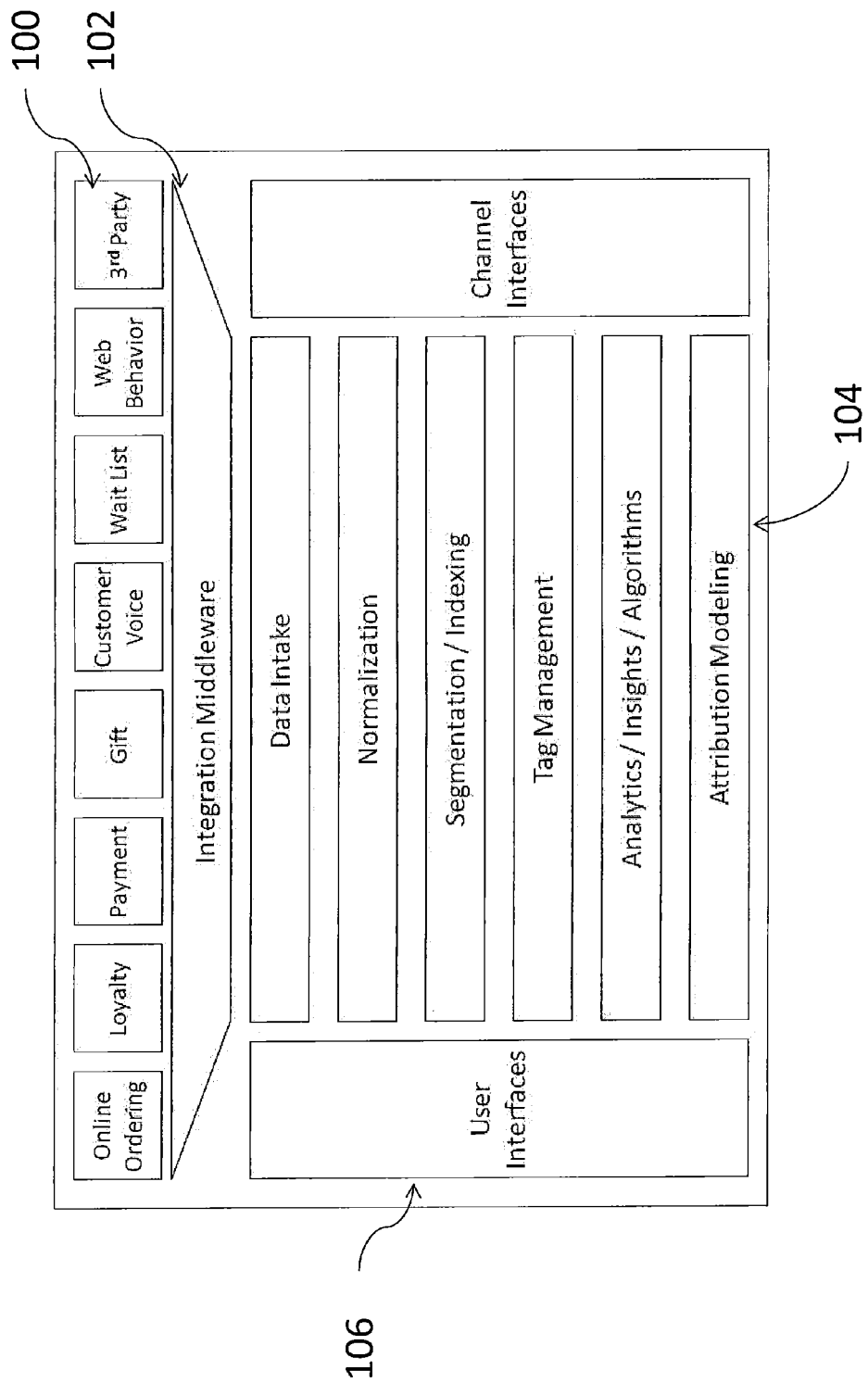
FIG. 1 shows a diagram of application components for a data management platform.

FIG. 1 shows a diagram of application components for one embodiment of the disclosed system. The system may receive information from a variety of data sources (100) or systems, such as those providing online ordering, loyalty management and processing, payment, gifts, voice commands, wait lists, general web behavior (e.g., tracking cookies, link traversal, geotargeting and location data), or $3^{rd}$ party provided. Data is received by an integration middleware (102), which may validate the data and cause it to be stored and processed by the system. Data management processes (104) performed on data received by the middleware (102) may include data intake, normalization, segmentation, indexing, tag management, analytics, insights, algorithms and attribution modeling. One or more user interfaces (106) may be provided to allow authorized access and interaction with the system. An insertion API may allow a user, such as a marketing or promotional company which services a plurality of brands, to insert data into the database. Data may be inserted to a generic API, or one or more brand specific APIs, depending upon the user's need for isolation of brand specific data.

A separate API may also be provided for querying data managed by the system. Such an API may expose an SQL-style query language that is then translated to queries on the actual backend database for the query (multiple backend databases are used with different query formats, such as mongo dB and elasticsearch). Part of this translation process involves optimizing queries for the target database. In some cases, unique methods utilizing information from the database may be used to perform queries not otherwise possible (for example, to match person objects containing a minimum count of child events). For example, using the disclosed technology, a system could be implemented which would be able to return a query for Females who haven't purchased in the last 30 days. Such a query could select all persons that (1) are associated with one or more profiles having information from an event that indicates gender and (2) are not associated with any profile generated from a commercial transaction event over the past 30 days. As another example, a query could return all persons who have been loyalty members for at least 45 days that have never made a purchase. Such a query could select all persons that (1) are associated with one or more profiles having information from an event generated by a loyalty program and (2) are not associated with any profile generated from a commercial transaction at any time. A query API such as described herein may be adapted to return people where each person is a flattened view of all the profiles that belong to the person. In such a case, the flattening can be done in a variety of ways, such as using a combination of field priority and input source priority. The returned data structure, whatever its contents, will preferably be consistent and normalized. The insertion and query API may be used by a variety of different user types. For example, a client user, such as a business generating data related to its customers and commerce, may use the insertion API to provide their own data to be managed by the system, and use the query API to examine their own data. A provider user may use the insertion API to provide data collected by the provider user or other third party sources, with the intent that the provided data be used by client users of the system, without having any need for using the query interface since a provider user is not using the data management aspects of the system.

The results of queries provided to a query API such as could be included in some embodiments may be exposed to users of the system as "lists" of people filtered by search criteria. Additional or alternative operations on these "lists" which could be supported in some embodiments include keeping a history of the list size (i.e., the query result set for each search criteria and the total), and taking a snapshot of a list result set in time, by marking person objects with the list ID. Additionally, in some embodiments, "lists" provided by a query might include multiple lists corresponding to independent requirements for the query, as well as a resultant list showing the result of combining those requirements. For example, a query for Mothers with iPhones who have not made a purchase in 45 days on a first day could return results showing 100 Mothers, 500 iPhone users, and 800 persons not making a purchase in 45 days but the resultant of the total query is an intersection 50 persons. On a second day or subsequent days, the same query could run providing a new result and additionally provide the delta against the previous result. In this manner, the number of mothers with iPhones not making purchases may be examined over a number of days, with a query occurring each day, so that any trends or changes may be examined and visualized.

In some embodiments, there may be an additional query API that is used for providing aggregate data. An aggregate query is a query that can query profile and event data while ignoring identifying data and person data. Aggregate queries can query on both events/profiles associated with a person, and events/profiles that could not be associated due to a lack of identifying information. This could be useful where aggregated, de-identified data is desirable as opposed to individual identifiable user data, such as product or service consumption within a city or region. For example, a query could be built to return top 5 menu items purchased for carryout on days where the temperature exceeds 90 degrees in Cincinnati. Since events represent occurrences that generate data, such as orders or web browsing activities, only events are required in order to return results for an aggregate query.

In one embodiment of the disclosed technology, a server and database may effectively model the data as a graph of profiles, where edges in the graph correspond to links between profiles. As will be described in more detail below, profiles can be linked together by any identifiable information that the profile may contain, including, but not limited to, internal user ID, tracking cookie ID, social network ID, email address, phone number, network fingerprint, etc. Profiles can also be linked by an event—if someone with a tracking cookie signs up for a website using an email address, we can then link profiles with that email address to the tracking cookie profile. Links/edges can have different strengths depending on the type of link. For example, because an association made by user account ID is more likely to represent the same person than an association made by name, a link based on user account ID can be given a higher strength than a link based on name. Common associations can be assigned a strength score so the association strength can be programmatically calculated. Auxiliary profile data (location, age range, etc.) that cannot be used to definitively make a link (e.g., because their strength scores are below the threshold for linking profiles, or because those fields were identified as auxiliary in advance) can be used to modify a link's strength (i.e., if the auxiliary information matches, the link strength is greater). The determination and use of link scores will be described in more detail below.

An sDMP can be implemented to separate the social, intellectual and material data for a person into its constituent parts for individual links connecting event generated profiles. Social data is accumulated from numerous social networking sites. Intellectual data denotes data developed by correlations of behavior into items such as interests, or viewing social media comments into sentiments. Material data reflects items such as purchase transactions. Every event (600) or group of closely related events generates a profile (602). A person (604) comprises one or more profiles (602) that are combined (e.g., using a variably weighted link algorithm based on the reliability of the data source and the weighted strength of the links between profiles (602) in real-time). In embodiments where it is used, data reliability can be determined in a variety of manners, but will preferably be determined based on two primary influences. The first of these preferred influences is the age of the data. For example, a person's interests or even place of residence can change over time or age of the person. The second of these preferred influences is the detail of the data. A person matched only on an address may not have the same reliability as address and age, since multiple persons with the same name or similar names may reside together. Events such as web surfing, check-ins, online ordering, marketing campaigns and loyalty events are all examples of events that may generate profiles (602). Person (604) creation can be tied to a calculated threshold allowing profiles (602) to shape persons (604) in real-time based on the link strengths.

As disclosed herein, it is possible to use the disclosed technology to dynamically identify people by partitioning a set of data regarding events which is represented as a profile graph. For example, in some implementations of the disclosed technology, a system may have a number of worker nodes that may receive, process, and communicate data in parallel and on demand. A number of data queues may also be used to pool and store incoming data until a worker node is available to consume and process the incoming data. Whenever data is inserted or modified (e.g., as a result of detection of an event), one or more worker nodes load a localized portion of the profile graph from the database. Such a localized portion can be programmatically sized in order to avoid excluding potential profiles based on a predetermined link strength threshold. A localized portion could be programmatically sized in varying ways depending upon the data modified or inserted and the computing resources available in a particular implementation. For example, where event data is introduced to the system, causing new profiles to be generated and new persons to be generated, the localized portion of the graph could be selected to include all existing profiles that share any fully or partially matching information with any new profile, which could be referred to as primary profiles. The localized portion could also include all profiles associated with a person, where the person is associated with a primary profile, with such profiles being referred to as secondary profiles. Extending the localized portion to this extended set of secondary profiles would create more opportunities to include profiles, but would require additional processing resources. The localized portion could be extended to a desired number of additional levels by, for example, including all profiles associated with a person, where the person is associated with a secondary profile, and so on. This localized portion of the graph can then be grouped into people by performing, for example, the steps shown in FIG. 2.

Figure 2:
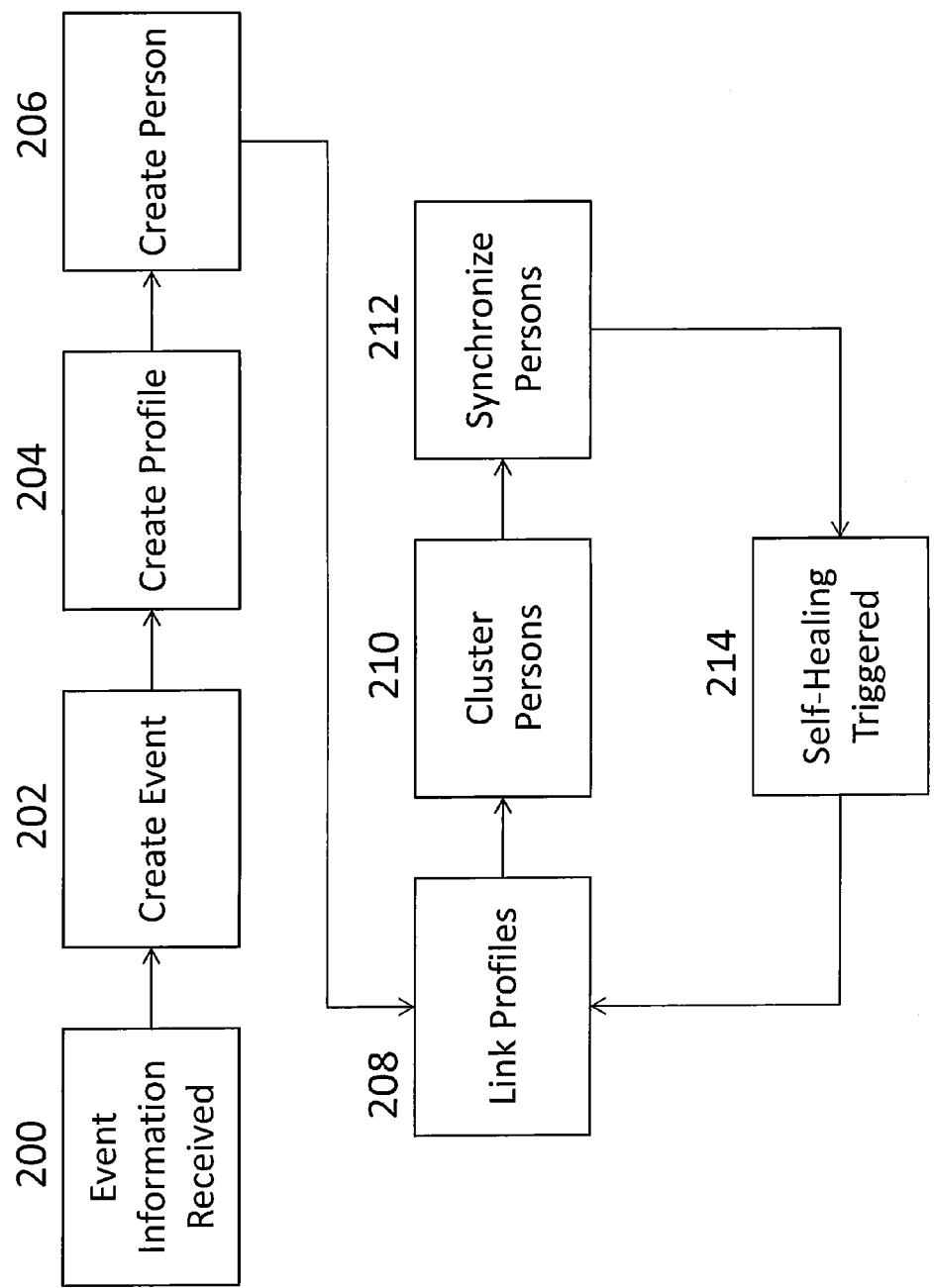
FIG. 2 is a flowchart of a set of steps that a system could perform to organize and manage received event data.

FIG. 2 shows a flowchart of a set of steps that a system could perform to organize and manage received event data so that it can be grouped into one or more individual person objects. When event information is received (200), an event object may be created (202). An event object may be created and retained by the system to allow the possibility of refactoring or repurposing the event data at a later time. However, in some embodiments, where minimizing stored data is a concern, an event object need not be created and permanently retained and event information could instead be passed directly to a profile object or discarded after receipt. When an event object is created (202), a system implemented using the disclosed technology will preferably automatically create (204) a profile for that event, populating the profile with whatever identifying information has been collected and received from when the event took place, as well as a person (206), populating the person with identifying information from the associated profile. In this manner, thinking of a profile in terms of a graph, each profile starts out as the nucleus of its own person. For example, if a restaurant which has agreed to provide data has a website which requires visitors sign in using their email address, then a user sign in is an event, the occurrence which causes the system to generate a profile (602) and person (604) containing the user's email address and any other information gathered when they signed in (e.g. tracking cookies, page visited). Once the profile (602) is generated, the system automatically links (208) it to other profiles (602). As profiles are linked (208), a set of linked profiles may be used in order to cluster (210) multiple persons together and generate a composite view of a single person, and synchronize (212) the newly created person with existing persons. While a newly created person (604) may only have information from one associated profile (602), a person (604) will in some cases have information from a plurality of associated profiles (602) after profiles are linked (208) and clustered (210).

For example, if a new profile for a current event includes information which is identical to information in an existing profile for a previous event (e.g. same email address used to sign in on multiple sites), a link can be created (208) between these profiles to indicate that they may be profiles of the same person. A set of linked profiles may then be used during a clustering step (210), where each directly and indirectly linked profile is examined to determine if they do belong to the same person. Similarly, if a new profile for a current event contains information from multiple existing profiles for multiple previous events, then the profiles for the previous events can be linked to each other, even though they may not have any information in common. For example, if a new profile for a current event includes both a tracking cookie and an email address, then that new profile can be used to link a first existing profile which includes the email address with a second existing profile which includes the tracking cookie.

The system performing the steps of FIG. 2 may also perform self-healing functions (214) in some circumstances. To support a database implemented using the described technology being self-healing, a global change in a field, such as the threshold, will preferably result in worker nodes rebuilding the displayed local sub graph immediately and the remainder of the database in background processes. The disclosed technology can also be applied in different manners to support database self-healing functionality. For example, if somehow data gets desynchronized, or the mechanics of linking (e.g. a threshold value is modified) or matching change, the algorithm can be run on existing profiles in the database to regroup them. In implementations where this is present, it will preferably occur automatically if data is updated, or new data is inserted that links to existing profiles. To illustrate how this can be useful, consider the fact that many events are loaded in batch (e.g. point of sale transactions) and the provider of the information may suddenly change the information provided, such as by including new locations with a sub-brand name.

For example "Good Egg" restaurant buys "Better Egg" restaurant resulting in "Best Egg" restaurant and includes the POS data for both with the different names. In such a case, the disclosed technology can be used to automatically reconstruct the brand hierarchy within the database and heal existing data to reflect the Good, Better and Best relationship. In cases where self-healing is triggered by a global change in data or desynchronization, the steps of linking (208), clustering (210), and synchronizing (212) may be performed on the affected profiles in order to achieve data integrity. For the "Best Egg" example above, self-healing could be triggered by a global modification to the data set performed by selecting all profiles having a source of "Good Egg" or "Better Egg" and modifying their source value to reflect the new "Best Egg." The self-healing process could then flag all of the modified profiles to be scheduled for linking (208), clustering (210), and synchronizing (212), since the profile information has changed, and refactoring with the new information may result in different links and persons.

Clustering (210) of persons from a profile graph can be performed by starting at a person and traversing outwards from that person's profile to linked profiles, grouping additional profiles with the person until no additional profiles which exceed the link strength threshold exist. Once all profiles have been grouped with persons based upon link strength, persons that contain strict subsets of profiles from other persons are merged together. In some embodiments, persons containing very similar (by percentage of matching profiles) lists of profiles may also be merged. This can result in a single profile being shared by more than one person, such as might take place when multiple people share a single computer. A tracking cookie profile that contains a particular IP address or other device identifier could be used by multiple profiles where, for example, a computer has multiple users providing their name and email address via several different websites, resulting in the identification of several distinct users of that computer. A tracking cookie profile that does not include other information that is indicative of a particular identity (e.g. email address or phone number), and that only contains information identifying the computer itself, may be shared by each of the multiple users of the computer. Linking (208), clustering (210), and synchronization (212) will be described in more detail during the discussions of FIGS. 3-5 and 7-13.

Figure 3:
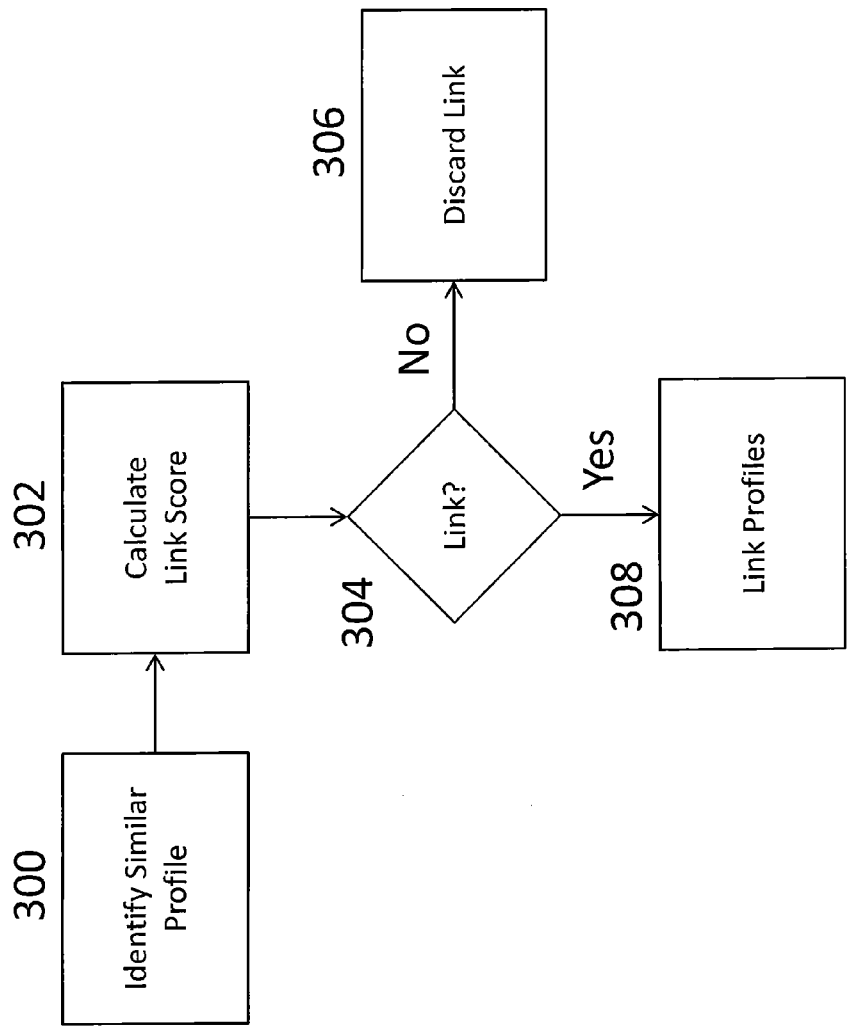
FIG. 3 is a flowchart of a set of steps that a system could perform to create links between profiles.
Figure 7:
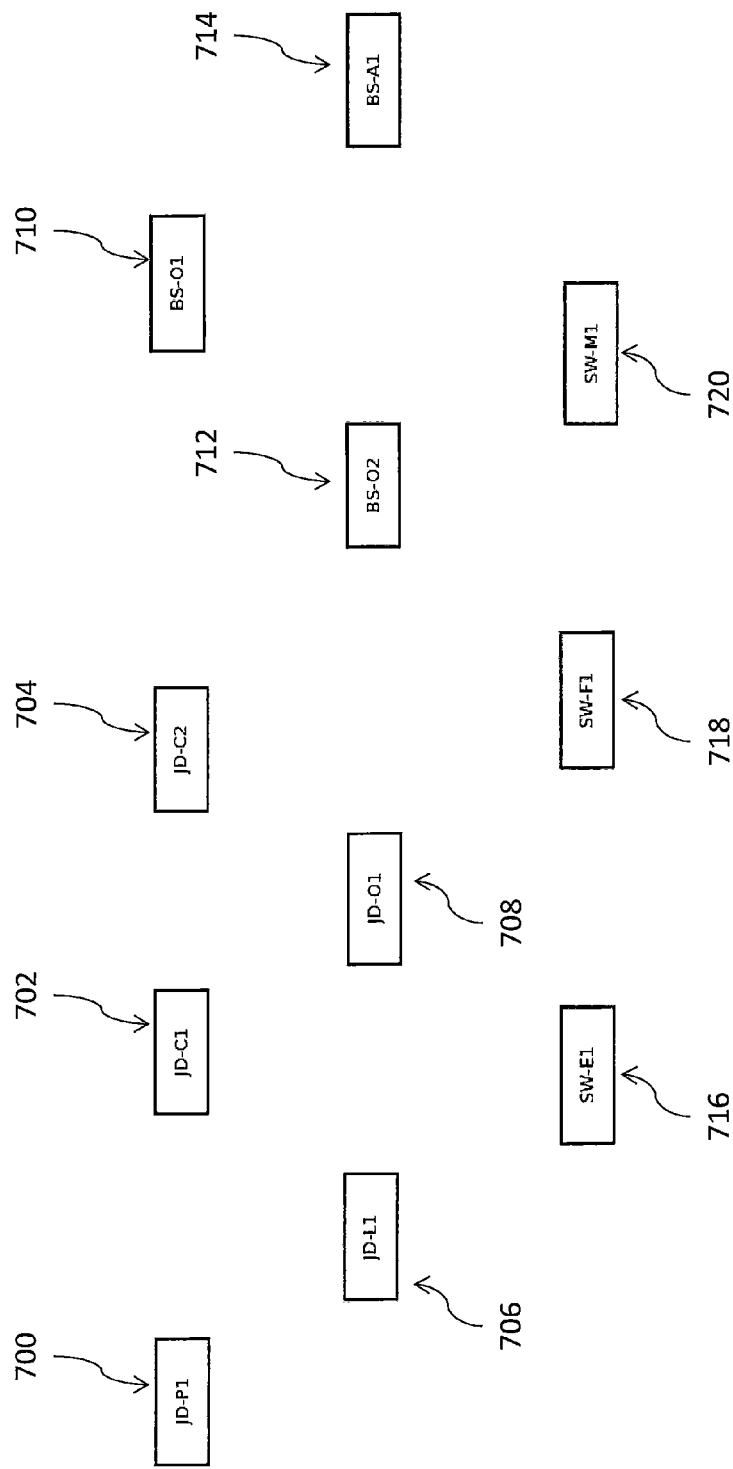
FIG. 7 shows a diagram of a plurality of unlinked profiles.
Figure 8:
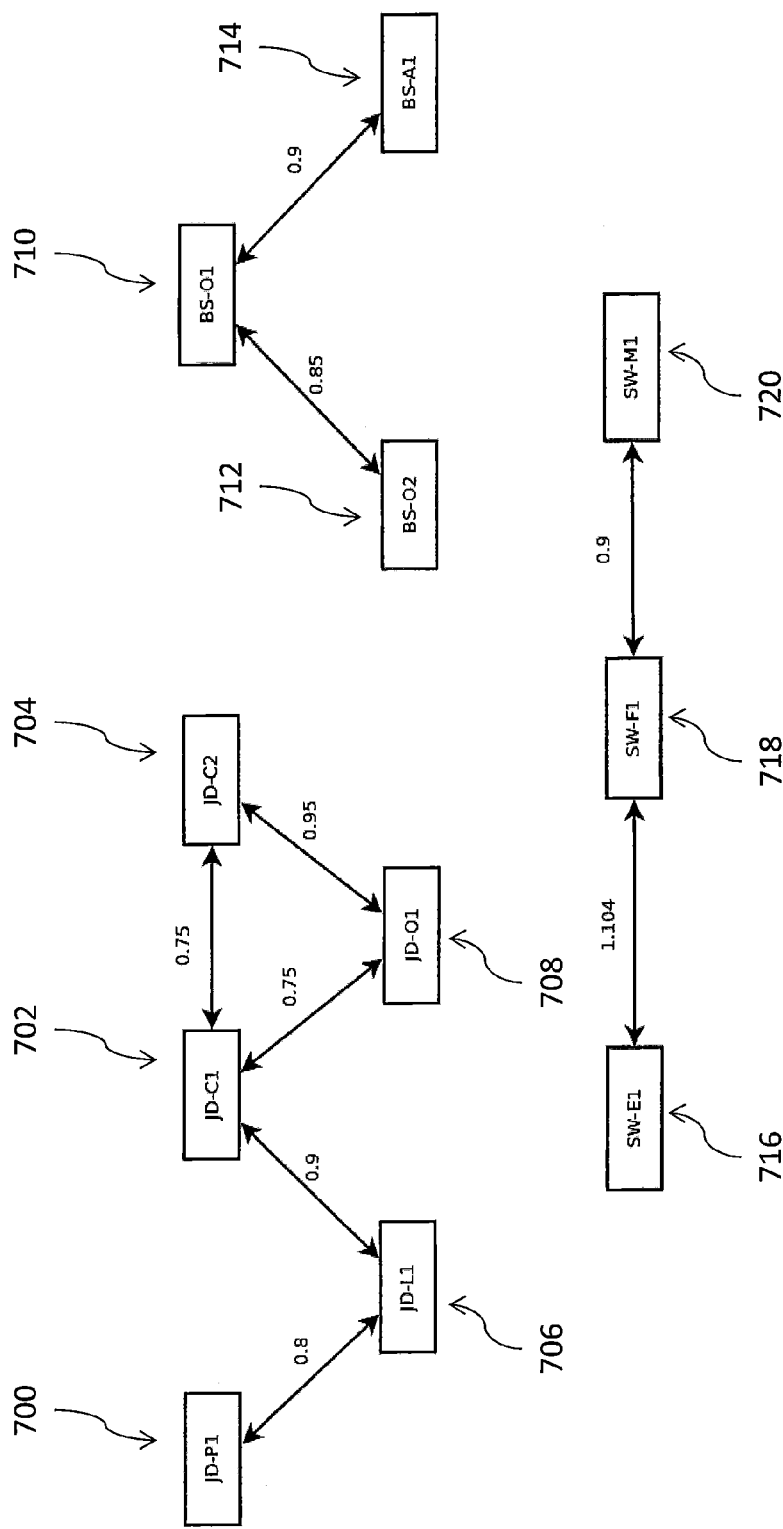
FIG. 8 shows a diagram of a plurality of linked profiles.

Turning now to FIG. 3, that figure shows a flowchart of a set of steps that a system implemented based on this disclosure could perform to create links (208) between profiles. Table 1, shown below, and FIGS. 7-8 provide exemplary data and illustrations used below in describing FIG. 3.

TABLE 1

Exemplary profiles and contained data.

| | |
|---|---|
| JD-C1 | Source: Tracking Cookie |
| | Tracking Cookie ID: T-1234 |
| | Email Address (from form signup): john.doe@gmail.com |
| | Contains many events relating to tracked web behavior |
| JD-C2 | Source: Tracking Cookie |
| | Tracking Cookie ID: T-1234 |
| | Phone Number (from form signup): 555-2000 |
| | Contains many events relating to tracked web behavior |
| JD-L1 | Source: Loyalty program signup |
| | Name: John Doe |
| | Email Address: john.doe@gmail.com |
| | Phone Number: 555-1000 |
| JD-P1 | Source: Phone call for pizza delivery |
| | Name: Jane Doe |
| | Phone Number: 555-1000 |

TABLE 1-continued

Exemplary profiles and contained data.

| | |
|---|---|
| | Address: 123 Testing Ln, Cincinnati, OH |
| | Contains at least the order event for the pizza delivery, possibly more if the person has ordered pizza multiple times with the same contact info |
| JD-O1 | Source: Online merchandise order |
| | Name: Jane Doe |
| | Tracking Cookie ID: T-1234 |
| | Phone Number: 555-2000 |
| | Email Address: jane.doe@gmail.com |
| | Contains events for each online merchandise order with this information |
| BS-O2 | Source: In-Store Order |
| | Credit Card Hash: C1:DF:22 |
| | Contains all ordering events for this credit card |
| BS-O1 | Source: In-Store Order with Feedback Form |
| | Credit Card Hash: C1:DF:22 |
| | Email Address: bill.smith@gmail.com |
| | Satisfaction with Service: 3/5 |
| | Contains single event with the ordering information for the one order |
| BS-A1 | Source: Third Party Append |
| | Name: Bill Smith |
| | Email Address: bill.smith@gmail.com |
| | Age: 28 |
| | Gender: Male |
| | Phone Number: 555-4444 |
| | Income Range: 40 k-50 k |
| | City: Cincinnati, OH |
| | Etc. |
| SW-E1 | Source: E-Club Signup |
| | Name: Sammy Williams |
| | Email: sammy.williams@gmail.com |
| | Gender: Male |
| SW-F1 | Source: Facebook |
| | Name: Sammy Williams |
| | Facebook ID: 100012345678 |
| | Email: sammy.williams@gmail.com |
| SW-M1 | Source: Mobile App, Connected with Facebook |
| | Facebook ID: 100012345678 |

When one or more new profiles have been introduced to a data set, or when self healing functions have been triggered, profile links can be created (208) for a particular profile by identifying similar profiles (300) based upon a full or partial match of the data they contain. For example, profiles JD-C1 (702) and JD-L1 (706) share a matching email address field, indicating that they should potentially be linked. An exact match of data may not be required though. For example, two profiles sharing a partial name match or partial address match may be similar enough to be evaluated for linking, depending upon the system configuration and desired application. Once a similar or matching profile has been identified, a link score between the two profiles may be calculated (302). Calculation of link scores will vary based upon a particular implementation of this technology, with such variations being apparent in light of this disclosure. One exemplary method of calculation would be to determine a final link score by combining a base score (e.g., a score determined by combining scores based upon highly reliable data) and an auxiliary score (e.g., a score determined by combining scores based upon less reliable data). Table 2 shows an exemplary equation that could be used to determine base score and auxiliary score, while Tables 3 and 4 show exemplary sets of data field weights for calculating base scores and auxiliary scores, determined based upon reliability factors such as age and generality. Using the equation of Table 2, and the exemplary weights of Tables 3 and 4, the link strengths between profiles, shown in Table 5, may be determined.

TABLE 2

Exemplary equation for determining base score and auxiliary score.

Base Score\Auxiliary Score =
1 - (1 — MatchingFieldWeight1)
* (1 — MatchingFieldWeight2)
* (1 — MatchingFieldWeight3)
...
* (1 — MatchingFieldWeightN)

TABLE 3

Exemplary weights for base score data fields.

| | |
|---|---|
| Tracking Cookie | .75 |
| Email Address | .9 |
| Phone Number | .8 |
| Credit Card Hash | .85 |
| Facebook ID | .9 |

TABLE 4

Exemplary weights for auxiliary score data fields.

| | |
|---|---|
| Name | .2 |
| Address | .1 |
| Gender | .005 |

TABLE 5

Results of calculations using equation of Table 1 and field weights of Tables 3 and 4.

| | |
|---|---|
| JD-C1 and JD-C2 | .75 |
| JD-C1 and JD-O1 | .75 |
| JD-C1 and JD-L1 | .9 |
| JD-C2 and JD-O1 | .95 |
| JD-L1 and JD-P1 | .8 |
| JD-P1 and JD-O1 | .2 |

Referencing Table 5, JD-C1 (702) and JD-C2 (704) have a link strength of 0.75, as they share a matching tracking cookie and no matching auxiliary fields. Using the equation of Table 2, and the exemplary tracking cookie weight of 0.75, the equation for determining base score would be 1−(1−0.75)= 0.75. Since there is no auxiliary score, the final score would be 0.75. A final link score of 0.75 would indicate a high likelihood that the two profiles in question are related to the same person. Conversely, JD-P1 (700) and JD-O1 (708) share no base score matches, and share only an auxiliary score data field, name. Using the equation of Table 2 and the exemplary name weight of 0.2, the link strength for JD-P1 and JD-O1 is determined to be 0.2. A final link score of 0.2 would indicate a low likelihood that the profiles in question are related to the same person.

Once link scores have been determined (302), a link score threshold may be applied to determine whether any of the calculated link scores should result in a link actually being created (304). A link score threshold may be configurable and may be determined based upon an end-user's need for accuracy of links or other commercial aspects. For example, assuming a link score threshold of 0.7, each score from Table 5 except for the score between JD-P1 and JD-O1 would result in a link between the profiles being created (308). If the link score threshold were raised to 0.8, indicating a need for more conservative linking of profiles, only the scores between JD-C1 (702) and JD-L1 (706), JD-C2 (704) and JD-O1 (708), and JD-L1 (706) and JD-P1 (700) would result in links being created (308). In instances where a calculated link score does not meet the threshold for creating a link, the link score and potential link (306) are discarded and the profiles remain unlinked.

FIGS. 7 and 8 each show a graph of the profiles described in Table 1 before and after the linking steps of FIG. 3 are performed. FIG. 8 shows the profiles of Table 1 with newly created links between profiles after applying the equation of Table 2, with a link score threshold of 0.7, and using the weights of Tables 3 and 4. As shown, links are created between JD-P1 (700) and JD-L1 (706), with a link strength of 0.8, JD-L1 (706) and JD-C1 (702) with a link strength of 0.9, JD-C1 (702) and JD-O1 (708) with a link strength of 0.75, JD-C1 (702) and JD-C2 (704) with a link strength of 0.75, JD-C2 (704) and JD-O1 (708) with a link strength of 0.95, SW-E1 (716) and SW-F1 (718) with a link strength of 1.104, SW-F1 (718) and SW-M1 (720) with a link strength of 0.9, BS-O2 (712) and BS-O1 (710) with a link strength of 0.85, and BS-O1 (710) and BS-A1 (714) with a link strength of 0.9.

Figure 4:
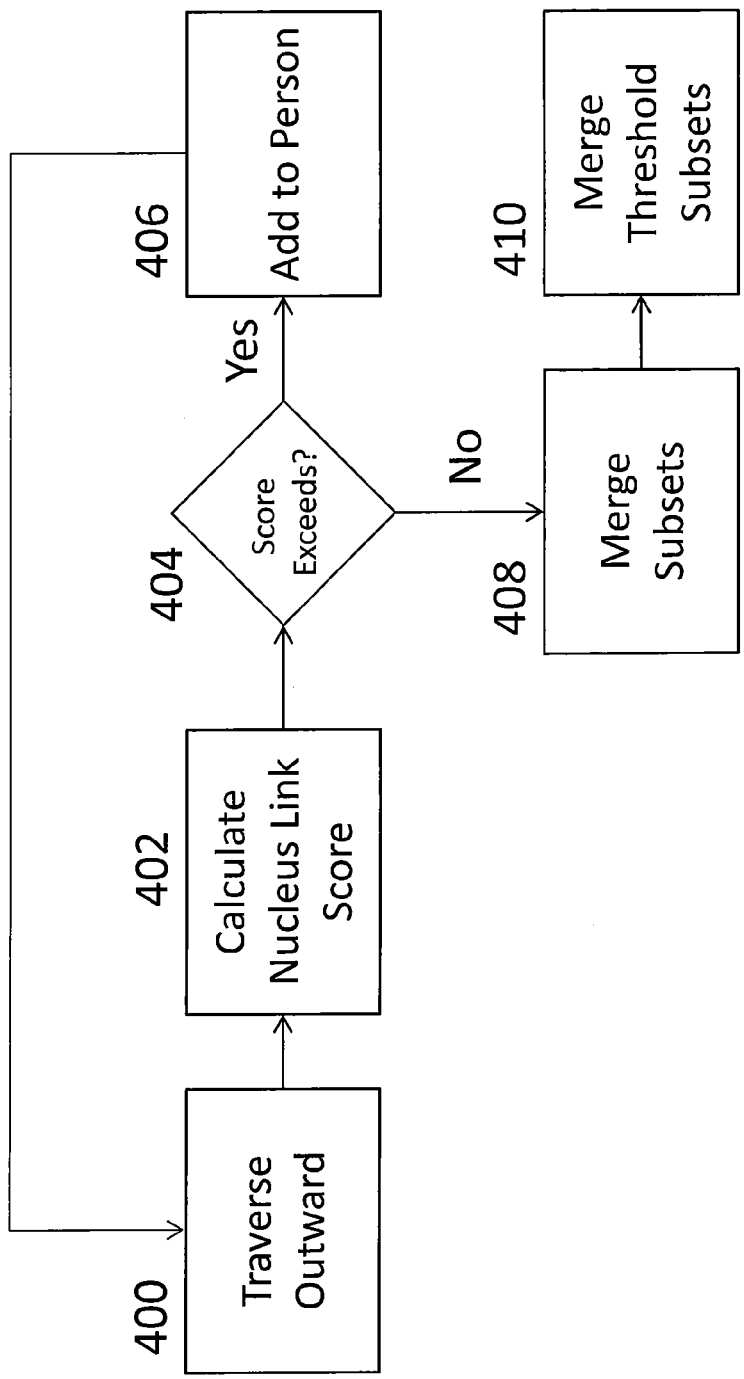
FIG. 4 is a flowchart of a set of steps that a system could perform to cluster linked profiles into persons.
Figure 9:
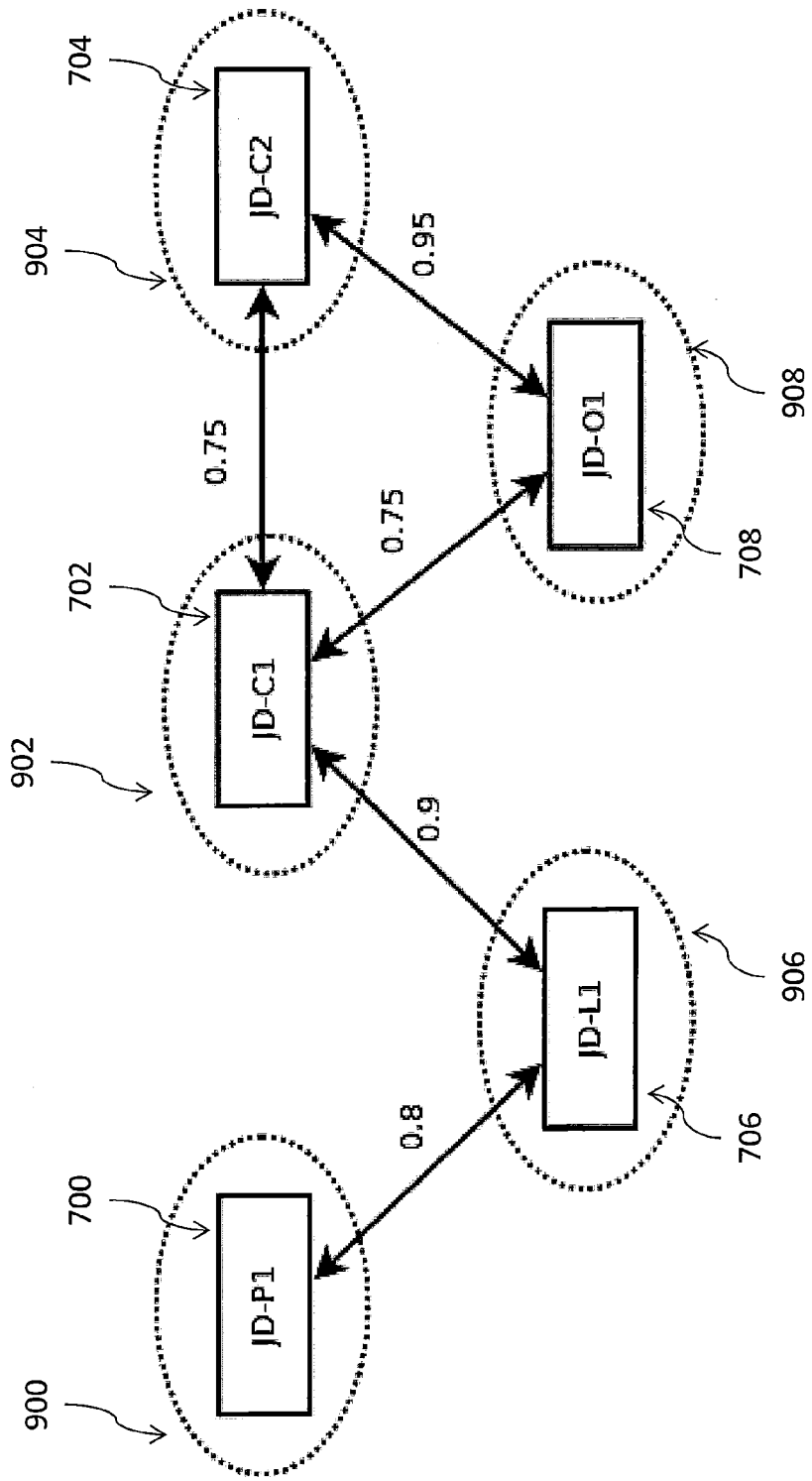
FIG. 9 shows a diagram of a subset of a plurality of linked profiles.
Figure 10:
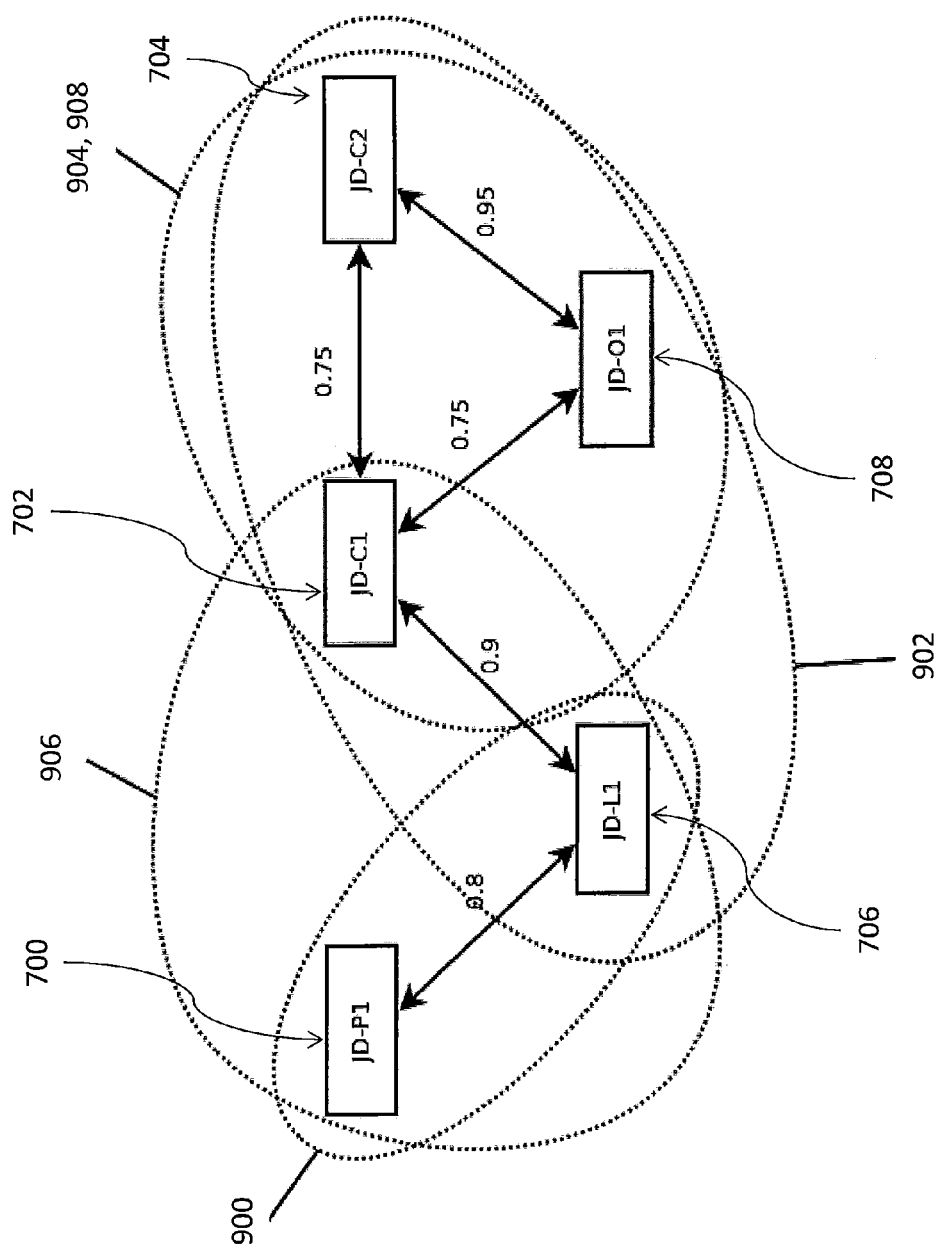
FIG. 10 shows a diagram of a subset of a plurality of linked profiles clustered into persons.
Figure 11:
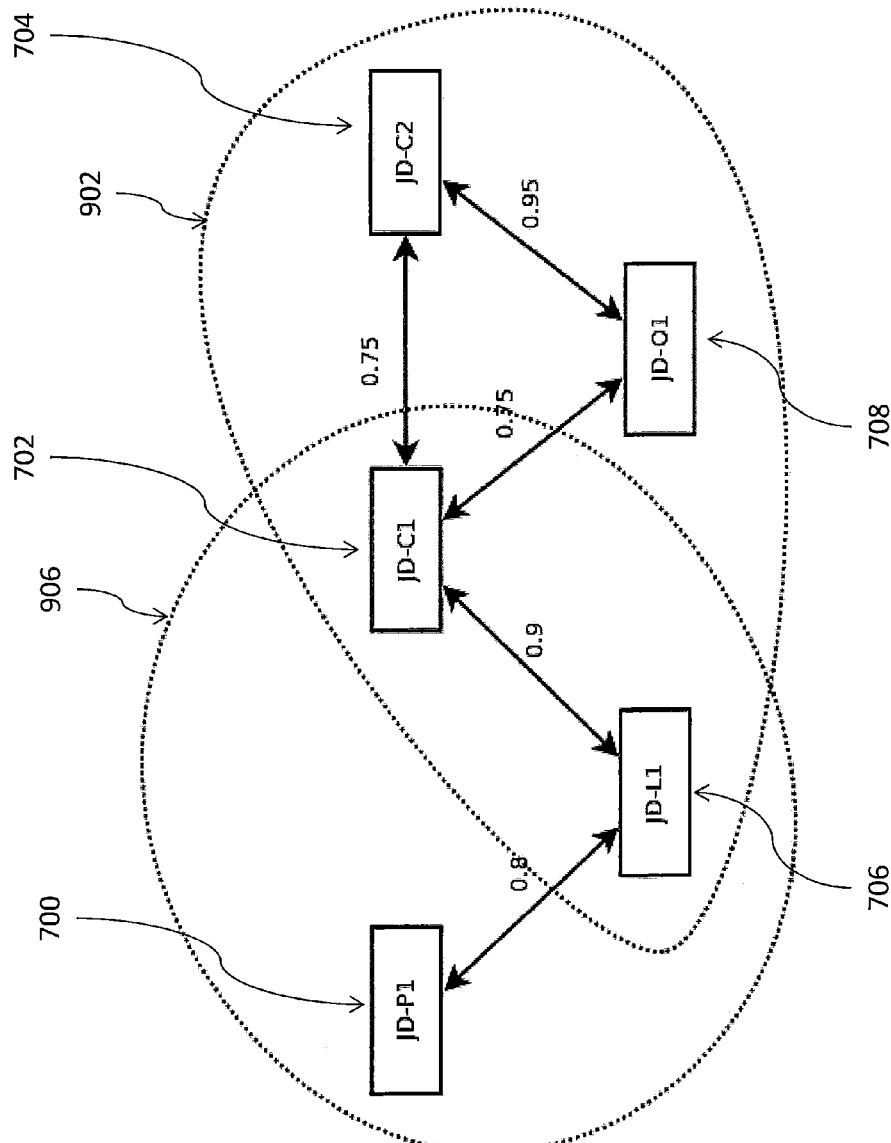
FIG. 11 shows a diagram of a subset of a plurality of linked profiles clustered and merged into persons.

FIG. 4 shows a flowchart of a set of steps that a system could perform to cluster linked profiles into persons, while FIGS. 9-11 show different views of subsets of linked profiles during the clustering (210) steps of FIG. 4. FIG. 9 shows a subset of profiles before the start of clustering. Each profile in the subset begins as a nucleus of its own person, with JD-C1 (702) being the nucleus of Person 1 (902), JD-C2 (704) being the nucleus of Person 2 (904), JD-L1 (706) being the nucleus of Person 3 (906), JD-P1 (700) being the nucleus of Person 4 (900), and JD-O1 (708) being the nucleus of Person 5 (908). The process begins at a person and traverses outward (400) from the person's profile to a linked profile. At each traversal, a nucleus link score is calculated (402) by determining the product of all traversed links between the current profile and the origin profile. If the nucleus link score exceeds (404) a threshold, the current profile is added (406) to the person of the origin profile, and then the process traverses outward (400) to a next linked profile. When a nucleus link score does not exceed (404) a threshold, the person is complete and the current profile is not added to the person. When all persons in a subset graph have gone through the process of traversing (400) until no more profiles are added, any person that is a subset of another person may be merged with the parent set (408). In some embodiments, any person who is not a complete subset, but who shares a percentage of profiles with another person that exceeds a threshold indicating a high similarity, will be merged (210) with the similar person.

As an example of how a person might be clustered using the steps of FIG. 4, the process could begin at Person 1 (902) of FIG. 9. Beginning at the profile JD-C1 (702) of Person 1 (902), traverse (400) outwards to JD-C2 (704). The link score between JD-C1 and JD-C2 is 0.75, meaning that the nucleus link score between JD-C1 and JD-C2 is 0.75, since the nucleus link score is determined by calculating the product of link scores between the current profile and the origin profile, and JD-C1 and JD-C2 are directly linked. Using a threshold of 0.75, the nucleus link score exceeds threshold, and the current profile JD-C2 (704) is added to Person 1. Repeating the traversal (400), calculation (402), and adding (406) steps for JD-O1 (708) and JD-L1 (706) results in both profiles being added to Person 1 with nucleus link scores of 0.75 for JD-O1 and 0.9 for JD-L1. When traversing (400) from JD-L1 (706) to JD-P1 (700), the nucleus link score is calculated (402) by determining the product of the link score between JD-C1 to JD-L1, 0.9, and JD-L1 to JD-P1, 0.8. This results in a nucleus link score of 0.72 between JD-P1 and JD-C1, which does not exceed (404) the threshold of 0.75, meaning that JD-P1 is not added to Person 1. Since there are no other profiles to traverse (400) to for Person 1, Person 1 is fully clustered and the process may be repeated for Persons 2-5.

FIG. 10 shows the subset graph of FIG. 9 after each person has fully traversed the graph and added profiles. Person 1 (902) now contains profiles JD-C1, JD-C2, JD-O1, and JD-L1. Persons 2 (904) and 5 (908) each now contain profiles JD-C1, JD-C2, and JD-O1. Person 3 (906) now contains profiles JD-L1, JD-P1, and JD-C1. Person 4 (900) now contains profiles JD-P1 and JD-L1. As can be seen in FIG. 10, Person 2 (904) and Person 5 (908) are now identical sets, and are also both subsets of Person 1 (902), while Person 4 (900) is a subset of Person 3 (906). When subsets are merged (408), Persons 2 (904) and 5 (908) are merged with Person 1 (902), and Person 4 (900) is merged with Person 3 (906), leaving only Persons 1 (902) and 3 (906) as shown in FIG. 11. These Person objects correspond roughly to Jane Doe and John Doe (which, based on the profiles, link values and thresholds used in this example, are presumed to be two separate people), in such a way that information likely to be shared between the two people (such as the tracking cookie on their shared computer) are represented in shared profiles. The data in these profile sets can be queried together to perform analytics on an overall representation of a person, rather than just a single slice of data (i.e., a single profile).

When subsets are merged based upon a threshold match (410), each person is examined to determine if a percentage of their profiles exceeding a configured threshold are contained within another person. For example, referencing FIG. 11, 50% of the profiles of Person 1 (902) are contained within Person 3 (906), and 66% of the profiles of Person 3 (906) are contained within Person 1 (902). With a configured merge threshold of 75%, no threshold merges would occur (410). If, however, the threshold were configured to be 65%, then Person 3 (906) would be merged with Person 1 (902) because 66% of its profiles are also contained with Person 1 (902).

Figure 5:
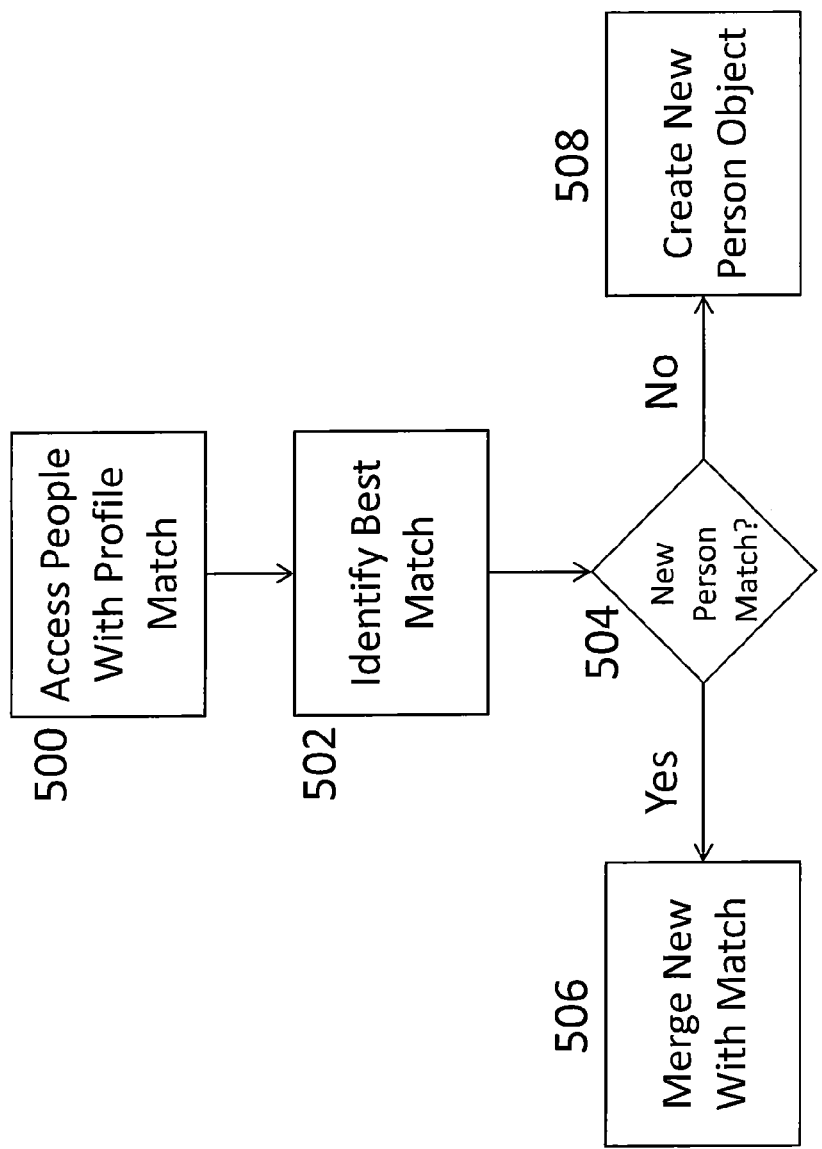
FIG. 5 is a flowchart of a set of steps that a system could perform to synchronize newly created people with existing people.

When clustering (210) is complete, the remaining persons can be synchronized (212) with existing person data. FIG. 5 shows a flowchart of a set of steps that a system could perform to synchronize newly created persons with existing persons. A set of stored persons are searched for profile data field matches (500) with new persons. For example, a newly created person may contain one or more profiles having a name, phone number, email address, or other information that matches the same data in already existing profiles stored in the system. If there are multiple existing people having matching profiles in common with the newly created person, a best match is identified (502) (e.g., by determining which already existing person shares the highest number of profiles with the newly created person). Once a best match is determined, or if there is only one potential match, the newly created person and the already existing person may be analyzed (504) by performing the linking (208) and clustering (210) steps to determine if the new person should be merged (506) with the existing person, or if a new person object should instead be created (508) and added to the database despite sharing similar or matching profiles.

Once the steps of FIG. 2 are complete, the system has been fully updated to reflect the introduction of the received (200) event information and organization into persons. Each resultant person object contains or is linked to a copy of each profile, as well as a copy of each profile's events, for efficient queries. Events can be synchronized using a separate set of worker nodes. Whenever a profile association is updated, the profile can be queued for event synchronization. The event synchronization ensures that the profile's events currently in the person container and newly discovered profile events match the list of profiles. This process can also be implemented to be self-healing such that, if interrupted, associated profiles will be correctly synchronized the next time the person is updated or accessed.

As the system implemented using the described technology is populated with data, it may become useful for a client user to insert data into and query for information. The system may be further configured to optimize functions for a particular client user, implementation, or use. For example, if a client user that owns or manages data for a brand submits a list of loyalty members, this data generates profiles immediately. If the data submitted is point of sale data, one or more events may be generated, which worker nodes can use to generate one or more associated profile objects. One embodiment of the system uses a number of data queues available via a server in order to manage prioritizing and transactional verification of data processing. Data queues contain input data waiting to be added to the database. These are dequeued in priority order and added to a single main operations queue, which contains internal operations. Each queue can either exist in memory caching or in a cloud queuing system, with the different properties afforded by each. In both cases, queue processing is handled in such a way that, if a queue operation fails, or the worker node executing the operation goes down, the operation is automatically re-queued after a delay. Operations in the queue can also be queued with a specified delay, which can be useful in the case of operations that should be performed after a database index has been refreshed. In the preferred embodiment, the main queue has a maximum size to prevent newly queued operations from taking too long to execute. This maximum size is determined dynamically to optimize the wait time, based on the number of operations currently waiting to execute.

Figure 14:
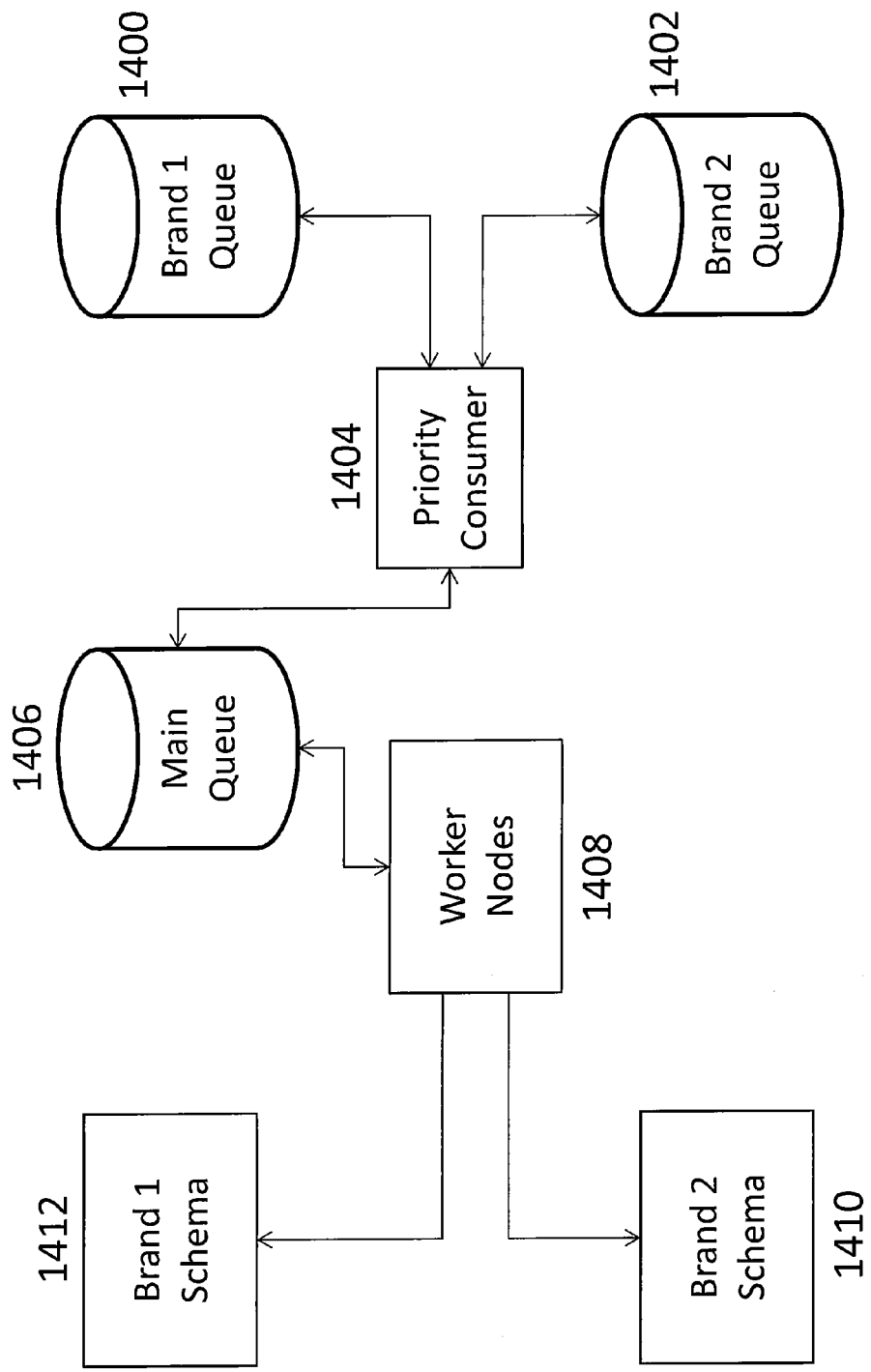
FIG. 14 shows a diagram of a queue configuration that could be used to process data from different users at different priorities.

FIG. 14 shows a queue configuration that could be used to manage such a priority based processing queue. A first brand queue (1400) and a second brand queue (1402) receive data pushed from two different client users. A priority consumer (1404) examines data as it arrives in one or more queues and assigns a priority rating depending upon the data type, volume, source, and other characteristics. Data type may affect priority because certain data may need to be acted on more quickly than other data. For example, customer loyalty data and promotion redemption may be of a type that is assigned a higher priority, while data such as web activity and brick and mortar purchases may be of a type that is assigned a lower priority. Data source can affect priority because certain client user data sources may have a subscription or negotiated service level that prioritizes them above other client users. Data volume may affect priority level because a larger insertion of data will take longer to process, and thus may be prioritized lower so that it can be processed outside of peak hours.

While tracking and managing priority, the priority consumer (1404) may also monitor availability of a main queue (1406), or receive notice from the main queue (1406) that the main queue is empty and worker nodes (1408) are available to process data. When the main queue (1406) is available, the priority consumer will select the highest priority data from either the first brand queue (1400) or the second brand queue (1402) and place it into the main queue (1406) so that the worker nodes (1408) may begin to consume and process data from the main queue (1406). As data is processed, the worker node (1408) will write processed data to a first brand schema (1412) if it came from the first brand queue (1400), or to the second brand schema (1410) if it came from the second brand queue (1402). In this manner, a brand's data, which may be valuable and sensitive private user and consumer data, may be isolated from another brands data as it moves from a brand specific queue (1400), (1402), to a main queue (1406), and then into a brand specific storage repository (1410, 1412). In some embodiments that use a priority queue, client user specific configurations may also be used when processing a client user's data within the main queue (1406). For example, if a client user would like to have a broad range of information about persons within their data set and is willing to sacrifice some accuracy of linking in order to achieve the desired range, a client specific link threshold, data field weight, or link score equation can be used on their data when it is processed, as opposed to the global configuration.

In the disclosed system, managing atomic operations and efficient locking of objects to prevent race conditions, data corruption, and other undesirable consequences may be beneficial. When there are work nodes running on the server continuously processing large amounts of data, an implementation with such a database runs the risk of events not being properly associated. A customized database allows locking and immediate access for data manipulation across database servers and worker nodes. Memory caching itself is not a clustered technology. A memory caching server cluster running custom, atomic lua scripts are utilized as a DLM (Distributed Lock Manager). A consistent hashing algorithm may be used to cluster the memory caching servers. These servers collectively hold the locking. The DLM supports mutex, traditional single-owner lock as well as reader/writer locks for multiple concurrent readers.

Figure 12:
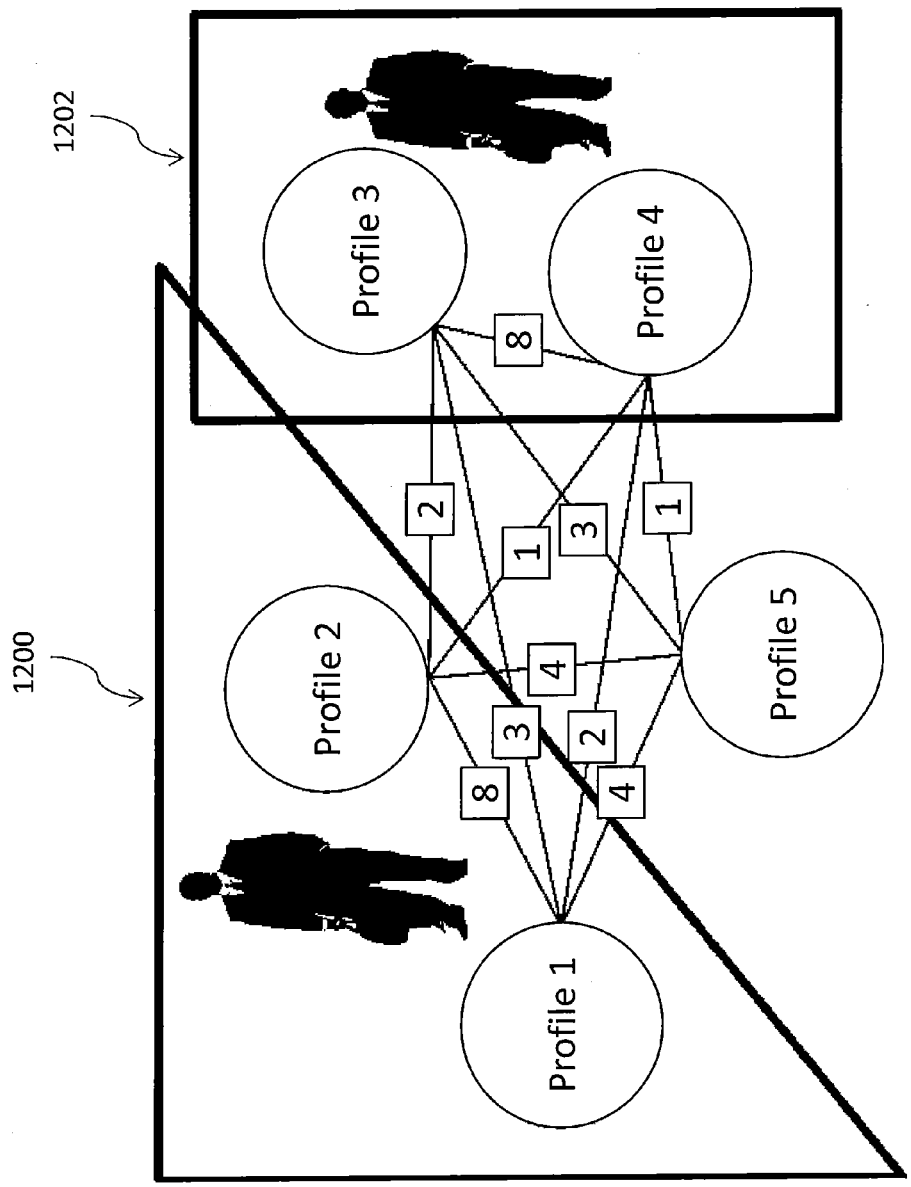
FIG. 12 shows a diagram of a person identified from profiles based upon a weighting strength of eight.
Figure 13:
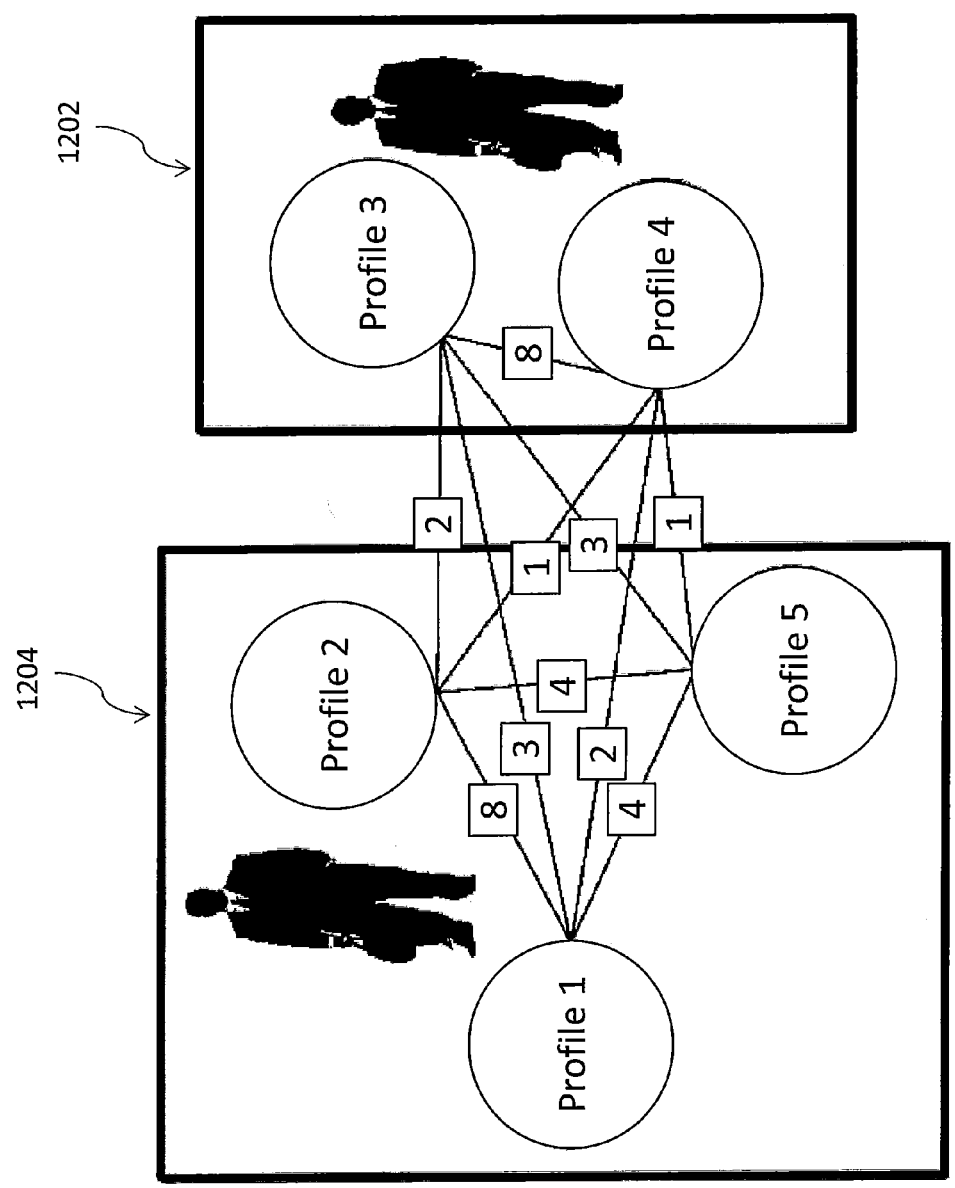
FIG. 13 shows a diagram of a person identified from profiles based upon a weighting strength of four.

While previous examples showed profile links being established based upon full matches of field values between two profiles, in some embodiments a full field match may not be required. For example, some embodiments may be capable of establishing profile links based upon partial matches by calculating a commonality score and determining if it exceeds a configured threshold. FIGS. 12 and 13 show a diagram of profile links and person identification based upon two different commonality weighting strengths, and Table 6 provides a set of exemplary information that can be used to describe this technique.

TABLE 6

Exemplary data set for commonality based linking.

| Profile A | Name: John Doe |
| | City: Cincinnati |
| Profile B | Name: Jane Doe |
| | City: Cincinnati |
| | Phone: 513-333-4444 |
| Profile C | Name: J. Doe |
| | Phone: 513-333-4444 |

In the example illustrated by FIGS. 12 and 13, the commonality scores are calculated by finding similar fields in both profiles and summing each of the individual matching field scores together. A field score is calculated based on the degree of matching, then augmented using a relevance factor for the field type. The commonality score may be augmented further by a reliability factor for the data source. Using the data from Table 6, the name field may have a relevance factor of 0.2, the phone number a factor of 0.5, and the city a factor of 0.04. Profile A and B name fields have a matching value of 0.5 and a relevance factor of 0.2 resulting in a field score of 0.25. In this example "John Doe" and "Jane Doe" have two words and the value of "Doe" matches. The city has a field score of 0.04. The resulting commonality score would be 0.25+0.04, equaling 0.29. Profiles A and C would have a commonality score of 0.25. Profiles B and C would have a commonality score of 0.75.

If the reliability of the data is questionable, the score can be further weighted.

For example, if the data sources of profiles A and C are known to be spotty and the data source of profile B is known to be reliable, the resulting commonality scores could be further modified using a reliability factor. For the commonality score for profiles A and B and B and C, the reliability factor could be 0.8 (i.e., the result of multiplying a value of 0.8 for the spotty data source and 1.0 for the reliable data source). For the commonality score for profiles A and C, this reliability factor could be 0.64 (i.e., the result of multiplying 0.8 by itself since the data sources for profiles A and C were both identified as spotty. Applying this type of reliability factor would result in final commonality scores of 0.232 for profiles A and B, 0.16 for profiles A and C, and 0.6 for profiles B and C (assuming that the application of the reliability factor was implemented by multiplying it by the previously calculated commonality score). If the chosen threshold is 0.575 then the only linked profiles would be B and C with a commonality score of 0.75*08=0.6. FIGS. 12 and 13 show a plurality of interlinked profiles and the commonality scores between them. Using a weighting strength of eight, a first person (1200) is identified including two profiles linked by a commonality score of 8, and a second person (1202) is identified including two different profiles linked by a commonality score of 8. FIG. 13 shows the same data set using a weighting strength of four, resulting in a first person (1204) including three profiles linked by commonality scores greater than or equal to four, and a second person (1202) including two profiles linked by a commonality score greater than or equal to four.

It should be understood that profiles which may not appear to be related could be linked based on information gleaned from subsequent events. Based on this Profile A might be linked with Profile C because profile A is linked to Profile B through the City and half the name, and because Profile B is linked to Profile C through the phone. In this example the commonality score is below the preset threshold so the link is not established at this moment. Factors of the type used in this example can be stored in a database table. Preferably, an implementation of the disclosed technology which includes such a table of factors will allow them to be set and adjusted manually (e.g., based on visual examination of the data).

Further variations on, and features for, the inventors' technology will be immediately apparent to, and could be practiced without undue experimentation by, those of ordinary skill in the art in light of this disclosure. Accordingly, instead of limiting the protection accorded by this document, or by any document which is related to this document, to the material explicitly disclosed herein, the protection should be understood to be defined by the claims, if any, set forth herein or in the relevant related document when the terms in those claims which are listed below under the label "Explicit Definitions" are given the explicit definitions set forth therein, and the remaining terms are given their broadest reasonable interpretation as shown by a general purpose dictionary. To the extent that the interpretation which would be given to such claims based on the above disclosure is in any way narrower than the interpretation which would be given based on the "Explicit Definitions" and the broadest reasonable interpretation as provided by a general purpose dictionary, the interpretation provided by the "Explicit Definitions" and broadest reasonable interpretation as provided by a general purpose dictionary shall control, and the inconsistent usage of terms in the specification or priority documents shall have no effect.

Explicit Definitions

When appearing in the claims, a statement that something is "based on" something else should be understood to mean that something is determined at least in part by the thing that it is indicated as being "based on." When something is required to be completely determined by a thing, it will be described as being "based exclusively on" the thing.

When used in the claims, "configured" should be understood to mean that the thing "configured" is adapted, designed or modified for a specific purpose. An example of "configuring" in the context of computers is to provide a computer with specific data (which may include instructions) which can be used in performing the specific acts the computer is being "configured" to do. For example, installing Microsoft® WORD on a computer "configures" that computer to function as a word processor, which it does by using the instructions for Microsoft WORD in combination with other inputs, such as an operating system, and various peripherals (e.g., a keyboard, monitor, etc).

When used in the claims, "determining" should be understood to refer to generating, selecting, defining, calculating or otherwise specifying something. For example, to obtain an output as the result of analysis would be an example of "determining" that output. As a second example, to choose a response from a list of possible responses would be a method of "determining" a response. As a third example, to identify data received from an external source (e.g., a microphone) as being a thing would be an example of "determining" the thing.

When used in the claims, a "means for creating a plurality of profile links between the profile object and a set of matching profile objects" should be understood as a limitation set forth in the form of a means for performing a specified function as provided for in the sixth paragraph of 35 U.S.C. §112 in which the specified function is "creating a plurality of profile links between the profile object and a set of matching profile objects" and the corresponding structure is a system having physical components such as servers and databases described in paragraphs [0018], [0030], [0044], and [0045], where the servers are programmed to perform algorithms including steps of identifying similar profiles, calculating link scores, evaluating link scores against a link threshold, and discarding or creating profile links (examples provided in FIG. 3 and paragraphs [0033]-[0036]).

When used in the claims, a "means for associating a clustered profile object of the set of matching profile objects with the person object" should be understood as a limitation set forth in the form of a means for performing a specified function as provided for in the sixth paragraph of 35 U.S.C. §112 in which the specified function is "associating a clustered profile object of the set of matching profile objects with the person object" and the corresponding structure is a system having physical components such as servers and databases described in paragraphs [0018], [0030], [0044], and [0045], where the servers are programmed to traverse outwards from an initial person and profile and calculate link scores or commonality scores at each traversal, then evaluate the calculated score against a threshold score to determine if the profile should be added to the person (examples provided in FIG. 4 and paragraphs [0038]-[0039], as well as FIGS. 12-13 and paragraphs [0048]-[0051]).

When used in the claims, a "means for adding the person object to the database" should be understood as a limitation set forth in the form of a means for performing a specified function as provided for in the sixth paragraph of 35 U.S.C. §112 in which the specified function is "adding the person object to the database" and the corresponding structure is a system having physical components such as servers and databases described in paragraphs [0018], [0030], [0044], and [0045], where the servers are programmed to identify a best match for the person from the existing data in the database by locating a person who shares the highest number of profiles with the newly created person, and if such a person exists merging the new person with the existing person, or if the person does not exist, adding the newly created person to the database (examples provided in FIG. 5 and paragraph [0042]).

When used in the claims, a "set" should be understood to refer to a collection containing zero or more objects of the type that it refers to. So, for example, a "set of integers" describes an object configured to contain an integer value, which includes an object that contains multiple integer values, an object that contains only a single integer value, and an object that contains no integer value whatsoever.

What is claimed is:

1. A system comprising:
a data management server in communication with a database;
a plurality of data sources in communication with the data management server;
wherein:
  a) the data management server is configured to receive an event data set from a data source of the plurality of data sources;
  b) the event data set comprises a set of information items describing event characteristics;
  c) the data management server is configured to, upon receiving the event data set, execute instructions to:
    i) create a profile object from the set of information items;
    ii) create a person object and associate the person object with the profile object;
    iii) create a plurality of profile links between the profile object and a set of matching profile objects, the set of matching profile objects comprising a second profile object;
    iv) associate the second profile object with the person object; and
    v) synchronize the person object with a set of other person objects within the database;
  d) the data management server is further configured to:
    i) expose a query interface that allows the database to be queried by a user to return a list of person objects; and
    ii) expose a submission interface that allows the event data set to be provided to the data management server;
    and
  e) the system further comprises instructions that, when executed, perform a self-healing process, wherein:
    i) the data management server is configured to monitor for:
      A) addition of records to the database;
      B) modification of records in the database;
      C) modification of a item weight value; and
      D) modification of a threshold value; and
    ii) the performance of the self-healing process is triggered by the detection of:
      A) addition of records to the database;
      B) modification of records in the database;
      C) modification of a item weight value; or
      D) modification of a threshold value;

iii) the self-healing process causes the data management server to execute instructions to:
   A) identify an affected person object, wherein the affected person object is associated with data in an affected profile object that is no longer accurate due to a change in the database that triggered the performance of the self-healing process;
   B) discard the existing association between the affected person object and an affected profile object;
   C) discard all existing profile links between the affected profile object and other profiles object stored in the database;
   D) create a plurality of profile links between the affected profile object and a second set of matching profile objects, the second set of matching profile objects comprising a second clustered profile object;
   E) associate the second clustered profile object with the affected person object and
   F) synchronize the affected person object with the set of other person objects within the database.

2. The system of claim 1, wherein:
a) the plurality of data sources comprises one or more of:
   i) an online ordering system;
   ii) a loyalty processing system;
   iii) a payment system;
   iv) a gift management system;
   v) a voice operated search system;
   vi) a wait list management system; and
   vii) a system reporting web behavior; and
b) the set of information items comprise two or more of:
   i) a source value;
   ii) a tracking cookie value;
   iii) an email address value;
   iv) a web behavior value;
   v) a phone number value;
   vi) a name value;
   vii) a location value;
   viii) a transaction value;
   ix) a credit card value;
   x) a customer feedback value;
   xi) a date of birth value; and
   xii) a unique identifier value.

3. The system of claim 1, wherein:
a) the profile object comprises one or more items of the set of information items, a profile identifier, and a set of links to the set of matching profile objects; and
b) the person object comprises a set of associations with a set of profile objects, and a person identifier.

4. The system of claim 1, wherein the set of matching profile objects comprises one or more other profile objects having a set of fully or partially matching item values for at least one of the set of information items of the profile object, and wherein instructions to create the plurality of profile links between the profile object and the set of matching profile objects comprise instructions to:
a) identify an unlinked profile object from the set of matching profile objects;
b) calculate a link score between the profile object and the unlinked profile object using a link score equation and a set of information item weights, wherein the set of information item weights provides, for each item value in the set of fully or partially matching items values, a weight value for that fully or partially matching item value; and
c) based upon an evaluation of the link score against a link threshold value, determine whether or not to create a link between the profile object and the unlinked profile object.

5. The system of claim 1, wherein instructions to associate the second profile object with the person object comprise instructions to:
a) access a directly linked profile object, the directly linked profile object having a profile link with the profile object, the profile link with the profile object having a first link score; and
   i) calculate a nucleus link score between the profile object and the directly linked profile object using a nucleus link score equation;
   ii) evaluate the nucleus link score against a cluster threshold value; and
   iii) associate the current profile object with the person object when the nucleus link score exceeds the cluster threshold value; and
b) access an indirectly linked profile object, the indirectly linked profile object having a profile link with the directly linked profile object, the profile link with the directly linked profile object having a second link score; and
   i) calculate the nucleus link score between the profile object and the indirectly linked profile object using the nucleus link score equation;
   ii) evaluate the nucleus link score against the cluster threshold value; and
   iii) associate the current profile object with the person object when the nucleus link score exceeds the cluster threshold value;
wherein the second profile object is selected from the group consisting of the directly linked profile object and the indirectly linked profile object.

6. The system of claim 5, wherein:
a) the nucleus link score equation determines the nucleus link score based on the value of the first link score when the second profile object is the directly linked profile object; and
b) the nucleus link score equation determines the nucleus link scored based on the product of the first link score and the second link score when the second profile object is the indirectly linked profile object.

7. The system of claim 5, wherein the data management server is configured to execute instructions after two or more person objects have been associated with the second profile object:
a) merge a child person object into a parent person object when each of the profile objects associated with the child person object are each also associated with the parent person object; and
b) merge the child person object into the parent person object when a percentage of the total profile objects associated with the child person object that exceeds a merge threshold value are also associated with the parent person object.

8. The system of claim 1, wherein instructions to synchronize the person object with the set of existing person objects comprise instructions to:
a) when there is not an existing person object contained in the database that shares at least one profile with the person object, add the person object to the database; otherwise
b) associate the person object with the existing person object sharing the highest number of profiles with the person object.

9. The system of claim 1, wherein the list of person objects returned by a query via the query interface comprises a plurality of person views, wherein a person view is a flat file view of a plurality of profile objects associated with the person object.

10. A system comprising:
a data management server in communication with a database;
a plurality of data sources in communication with the data management server;
wherein:
- a) the data management server is configured to receive an event data set from a data source of the plurality of data sources;
- b) the event data set comprises a set of information items describing event characteristics;
- c) the data management server is configured to, upon receiving the event data set, execute instructions to:
  - i) create a profile object from the set of information items;
  - ii) create a person object and associate the person object with the profile object;
  - iii) create a plurality of profile links between the profile object and a set of matching profile objects, the set of matching profile objects comprising a second profile object;
  - iv) associate the second profile object with the person object; and
  - v) synchronize the person object with a set of other person objects within the database;
- d) the data management server is further configured to:
  - i) expose a query interface that allows the database to be queried by a user to return a list of person objects; and
  - ii) expose a submission interface that allows the event data set to be provided to the data management server;
  and
- e) the data management server is configured to execute instructions to:
  - i) place the event data set in a brand specific processing queue based upon the data source, when the event data set is received via the submission interface;
  - ii) move the event data set to a main processing queue based upon a priority determination based upon the data source and contents of the event data set;
  - iii) create the plurality of profile links, associate the second profile object with the person object, and synchronize the person object with the set of existing person objects on the event data set after it is moved to the main processing queue; and
  - iv) isolate data in the brand specific processing queue from a second brand specific processing queue.

* * * * *